April 19, 1960 E. A. GOLDBERG ET AL 2,933,254

COMPUTING DEVICE

Filed May 3, 1954 3 Sheets-Sheet 1

INVENTORS
Edwin A. Goldberg
& Arthur W. Vance
BY Morris A. Rabkin
ATTORNEY

April 19, 1960 E. A. GOLDBERG ET AL 2,933,254
COMPUTING DEVICE
Filed May 3, 1954 3 Sheets-Sheet 2
Fig. 5.
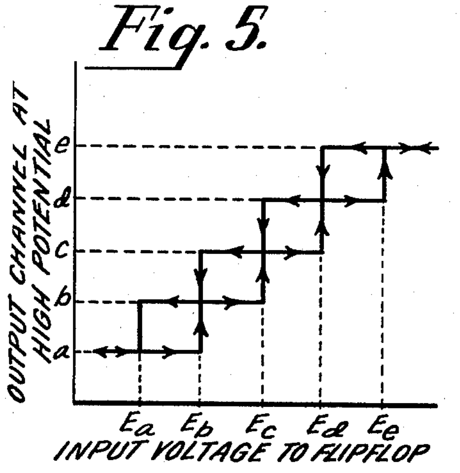
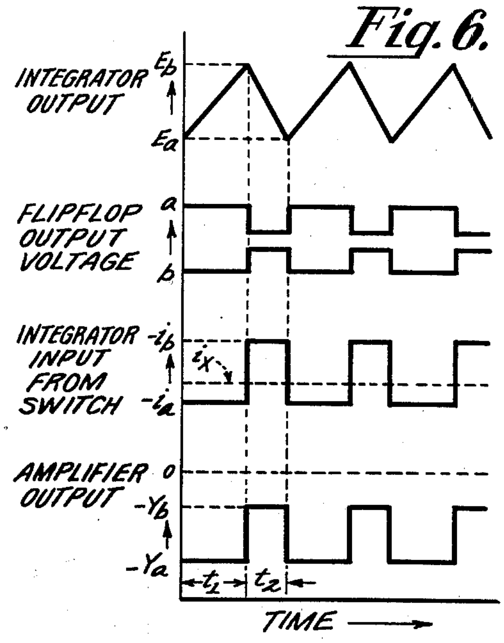
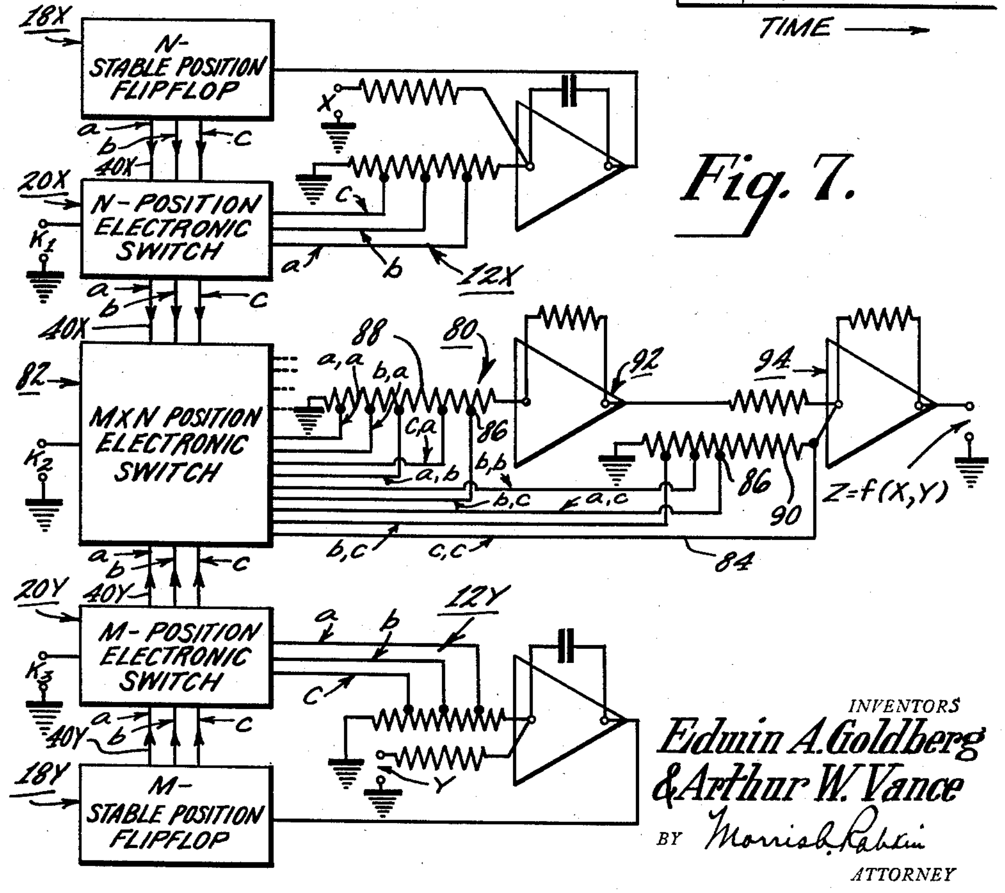
Fig. 6. Fig. 7.
INVENTORS
Edwin A. Goldberg
& Arthur W. Vance
BY Morris L. Rabkin
ATTORNEY April 19, 1960 E. A. GOLDBERG ET AL 2,933,254

COMPUTING DEVICE

Filed May 3, 1954 3 Sheets-Sheet 3

INVENTORS
Edwin A. Goldberg
& Arthur W. Vance
BY Morris A. Rabkin
ATTORNEY

Patented Apr. 19, 1960

2,933,254

COMPUTING DEVICE

Edwin A. Goldberg, Princeton Junction, and Arthur W. Vance, Cranbury, N.J., assignors to Radio Corporation of America, a corporation of Delaware Application May 3, 1954, Serial No. 427,085

13 Claims. (Cl. 235—197)

This invention relates to computing devices and particularly to apparatus for deriving mathematical functions of one or more variables.

Presently known apparatus for generating mathematical functions of one or more variables are described in the book "Electronic Analog Computers" by Korn and Korn, McGraw-Hill, chapter 6. Examples of the apparatus employed in function generators are tapered and linear potentiometers, cathode-ray tubes with variable-density masks, and diode and relay switching circuits. Most of these apparatus are limited in their utility either by the accuracy that can be attained or by the speed of response, or both. In addition, many of the aforementioned examples must be specially built for each particular function to be derived and cannot be used for other functions. The construction of such specialized apparatus may entail considerable expense and loss of time. Therefore, it is desirable to have a function generator that is not restricted to a single function, but, instead, can be used to derive a wide variety of functions, including functions of empirical data, as a universal or arbitrary function generator.

Accordingly, it is among the objects of this invention (1) To provide a new and improved arbitrary function generator;

(2) To provide a computing device for deriving functions of one or more variables that is extremely accurate;

(3) To provide a computing device for deriving functions of one or more variables that is extremely fast in operation; and (4) To provide an improved arbitrary function generator that is reliable, accurate and fast in operation.

The arbitrary function generator of this invention incorporates principles similar to those of time-division and pulsed-attenuator computers described and claimed in the U.S. patent to A. W. Vance, No. 2,661,153: described in the article by E. A. Goldberg in the RCA Review, September 1952, page 265; in the article by Morrill and Baum in Electronics, December 1952, page 139, in the book "Electronic Instruments" by Greenwood et al., Radiation Laboratory Series, McGraw-Hill, volume 21, chapter 3, page 50; and in the book by Korn and Korn, cited above, page 223.

In accordance with this invention, a master time-division computing device is employed to generate switching signals on different channels that respectively correspond to different preselected values of a variable. Interpolation between two preselected values is provided by time-division of the durations of the switching signals on the corresponding two channels. A slave computing device includes means for supplying different magnitude currents to an output amplifier. Each of the slave currents corresponds to a different preselected value of the variable. Switching means in the slave device controls the feeding of the corresponding currents to the output amplifier in accordance with the switching signals. The magnitudes of the currents corresponding to preselected values of the variable may be arbitrarily chosen so that any arbitrary function of the variable may be derived.

A function of two independent variables X and Y is derived, in accordance with this invention, by employing two master computing devices, one for each variable. The X and Y master devices independently generate switching signals on different X and Y switching channels, respectively, in accordance with the associated variable. Each combination of X and Y switching channels corresponds to a set of X and Y preselected values. A common slave device is arranged to feed a different magnitude current to an output amplifier for each combination of an X and a Y switching channel. The magnitudes of the slave currents may be arbitrarily assigned so that any function of X and Y can be generated. Due to the time-division of the switching signals, there is interpolation, for any set of X and Y values, among the four sets of surrounding preselected values.

The master computing device incorporates a closed feed-back loop that includes an N-position electronic switch, an integrator and an N-stable-position flip-flop. The integrator input receives a current proportional to the variable and one of N different magnitude currents from the electronic switch. The flip-flop generates a switching pulse on one of N switching channels in accordance with the amplitude of the voltage at the integrator output. The switch, in response to the switching pulse, feeds the corresponding one of the N currents to the integrator input to balance the variable current and reduce the net current to the integrator to zero.

In a generator for functions of one variable, the slave also has an N-position electronic switch, one position for each of the N switching channels from the master. The slave switch feeds different magnitude currents through one of N current paths to the output amplifier in response to the switching pulses. In a generator for two variables X and Y, the X master has an N-position switch, and the Y master has an M-position switch. The slave has an M$x$N-position switch, one position for each different combination of an X and a Y position.

The foregoing and other objects, the advantages and novel features of this invention, as well as the invention itself both as to its organization and mode of operation, may be best understood when read together with the accompanying drawing, in which like reference numerals refer to like parts, and in which:

Figure 5 is an idealized graph of the characteristic of a flip-flop that may be used in the computing device of Figure 1;

Figure 6 is an idealized graph of waveforms occurring at various portions of the computing device of Figure 1;

Figure 7 is a block diagram of another embodiment of this invention which may be used for generating functions of two variables;

Figure 1:
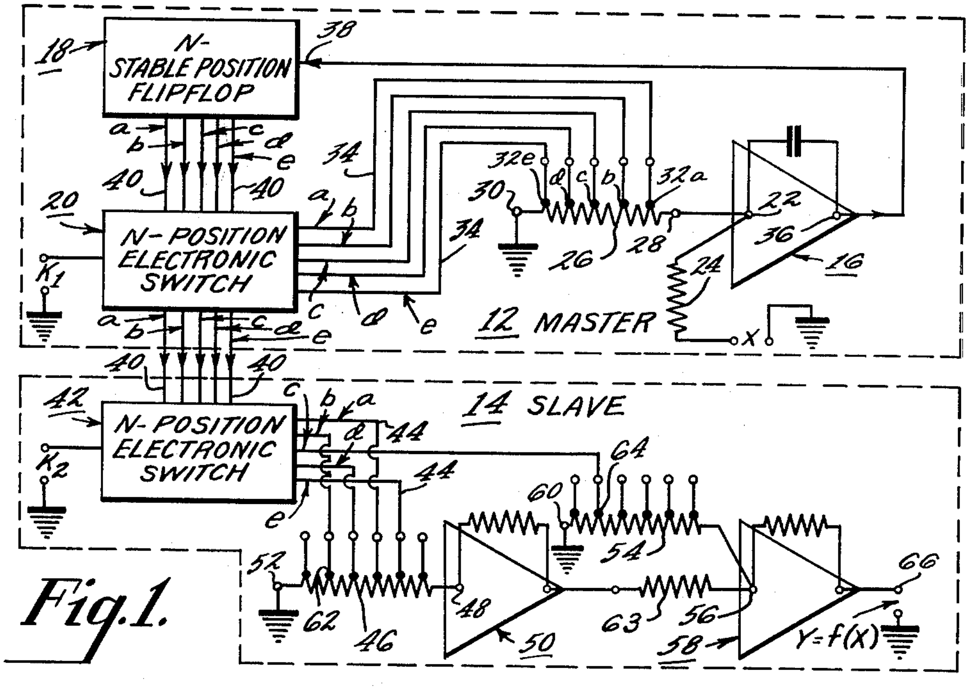
Figure 1 is a block diagram of a computing device embodying this invention for generating functions of one variable.

Referring to Figure 1, there is shown a computing device for deriving functions of one variable, X. The computing device is made up of a master 12 and a slave 14. A feedback loop in the master device 12 includes an integrating amplifier 16, an N-stable-position flip-flop 18, and an N-position electronic switch 20. A current proportional to a variable voltage X is applied to the input 22 of the integrator 16 through an input resistor 24. A current-dividing resistor 26 is connected at one terminal 28 to the integrator input 22 and at another terminal 30 to a reference potential shown as the conventional ground symbol. Intermediate these two terminals 28, 30 are a plurality of additional channels 32*a* to 32*e* which are connected through N separate current paths 34*a* to *e* to the electronic switch. The output 36 of the integrator 16 is connected to the input 38 of the flip-flop 18. The outputs of the flip-flop 18 are N switching channels 40*a* to *e* which are connected to the master electronic switch 20.

The flip-flop switching channels 40 are also connected to an N-position electronic switch 42 in the slave 14. The outputs of the slave electronic switch are N current paths 44*a* to *e*. A current-dividing resistor 46 is connected at one terminal 48 to the input of a phase-inverting amplifier 50 and at another terminal 52 to ground. Another current-dividing resistor 54 is connected at one terminal 56 to the input of an output amplifier 58 and at another terminal 60 to ground. A resistor 63 connects the output of the phase-inverter 50 to the input 56 of the output amplifier 58. The current paths 44*a*, 44*b*, 44*d*, and 44*e* from the slave electronic switch 42 are connected to different intermediate terminals 62 on the current-dividing resistor 46. The path 44*c* from the slave switch 42 is connected to an intermediate terminal 64 on the current-divider resistor 54. The output of the computing device may be taken at a terminal 66 connected to the output of the output amplifier 58.

The amplifiers 16, 50, 58, 72 are of the feedback type. An appropriate circuit is described in the article by E. A. Goldberg in RCA Review, June 1950, page 294.

Appropriate N-stable-position flip-flops are described in the patent specification of E. A. Goldberg, Serial No. 401,682, filed December 31, 1953, now U.S. Patent 2,838,663, issued June 10, 1958, and in the patent application of C. Shumard, Serial No. 401,669, filed December 31, 1953, now U.S. Patent 2,782,373, issued February 19, 1957. As described in these patent specifications, the flip-flop 18 has an operating characteristic such as shown in Figure 5 in idealized form. The flip-flop 18 produces a high voltage rectangular pulse on one of the switching channels 40 in accordance with the amplitude of the voltage at the integrator output 36. All of the other switching channels 40 receive a relatively low voltage rectangular pulse. As the flip-flop input voltage changes from the low end of the range to the high end of the range, namely from $E_a$ to $E_e$, the high voltage switching pulse is successively shifted to the corresponding switching channels 40*a* to 40*e*. Similarly, as the flip-flop input voltage varies in the opposite direction, from $E_e$ to $E_a$, the switching pulse is applied to the channels successively in the reverse direction, from 40*e* to 40*a*. As shown in Figure 5, there is a "backlash" or hysteresis effect in the operating characteristic of the flip-flop. When the flip-flop input voltage rises to a predetermined level, say $E_c$, a switching pulse is applied to the corresponding channel 40*c*. As the input voltage falls from $E_c$ the switching pulse continues on the channel 40*c* until the input voltage reaches a lower voltage level shown as $E_b$. At the level $E_b$, the switching pulse is shifted to the channel 40*b*. It is by means of this backlash characteristic that interpolation is provided, as explained below.

Figure 4:
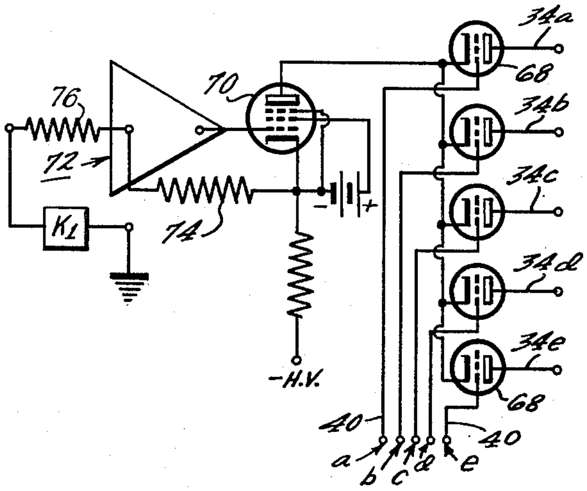
Figure 4 is a schematic circuit diagram of an electronic switch that may be used in the computing device of Figure 1.

Corresponding to each of the switching channels 40 is a different current path 34 from the master electronic switch 20. An appropriate form of electronic switch is shown in Figure 4. Each of the current paths 34 includes a different switch tube 68 in the electronic switch 20. The anode of each tube 68 is connected to a different one of the intermediate terminals 32 of the current-dividing resistor 26. The grids of the tubes 68 are connected to different switching channels 40. The cathodes of the switch tubes 68 are connected together and to the anode of a pentode 70. The control grid of the pentode is connected to the output of an amplifier 72, and the cathode of the pentode is connected through a feedback resistor 74 to the input of the amplifier 72. A source of constant voltage $K_1$, is connected to the amplifier 72 input through a resistor 76. As described in the aforementioned Patent No. 2,619,594, the pentode 70 and amplifier 72 provide a constant-current source. One of the switch tubes 68 is rendered conductive by a high voltage switching pulse on the associated channel 40 from the flip-flop 18. All the other switch tubes 68 are held cut off by the low voltage on the other channels 40. Thus, when one of the switching channels 40 rises in voltage, the corresponding switch tube 68 is rendered conductive and a constant current is applied through the corresponding current path 34 to the current-dividing resistor 26.

Figure 2:
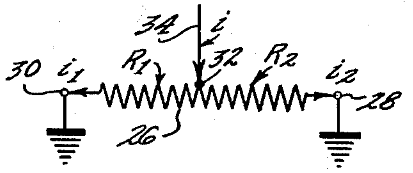
Figure 2 is a schematic circuit diagram illustrating the mode of operation of a portion of the device of Figure 1.

The operation of the current-dividing resistor 26 is illustrated in Figure 2. Due to the high gain and feedback of the integrating amplifier 16 the amplifier 16 has substantially zero forward impedance. Therefore, the integrator input 22 may be considered to be substantially at ground potential. Consequently, the current-dividing resistor 26 may be considered to have the end terminals 28, 30 at ground potential. A constant current is fed to an intermediate terminal 32 through one of the current paths 34 from the switch 20. If the two branches of the resistor 26 formed by the intermediate terminal 32 have resistances $R_1$ and $R_2$, respectively, and the currents through those branches are $i_1$ and $i_2$, respectively, then $$i_1R_1=i_2R_2, \text{ and}$$

$i_1+i_2=i$, where $i$ is the constant current from the switch 20. Solving for $i_2$.

$$i_2=i\frac{R_1}{R_1+R_2}$$

Thus the current fed to the integrator input 22 from each current path 34 is proportional to the resistance $R_1$ from the grounded terminal 30 to the intermediate terminal 32 of that current path 34.

Figure 3:
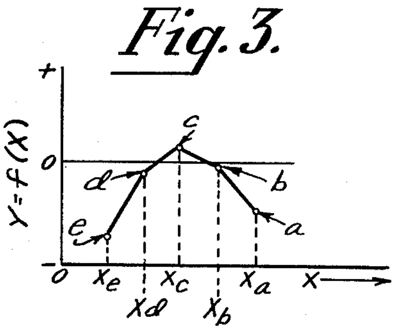
Figure 3 is an idealized graph of a function that may be generated with the computing device of Figure 1.

N preselected values of X are chosen within the range of X for which the function is to be derived. These preselected values $X_a$ to $X_e$ are shown in Figure 3. Each of the flip-flop 18 and switch 20, 42 positions and each of the intermediate terminals 32, 62, 64 on the current-dividing resistors 26, 46, 54 correspond to one of the preselected values $X_a$ to $X_e$. The positions of the intermediate terminals 32 of the master 12 current-dividing resistor 26 are such that the current $i_a$ to $i_b$ from each intermediate terminal to the integrator input is equal in amplitude to the current produced by the corresponding one of the preselected values $X_a$ to $X_e$. Thus, the resistance from the grounded terminal 30 to each intermediate terminal 32 is proportional to the corresponding preselected value $X_a$ to $X_e$.

The closed feedback loop of the master computing device 12 operates to produce at the integrator output 36 a different voltage amplitude $E_a$ to $E_e$ for each of the preselected values $X_a$ to $X_e$. If the value of X is $X_b$, the integrator output tends to be $E_b$. As a result, the flip-flop 18 produces a switching pulse on the corresponding channel 440*b*. The switching pulse, in turn, renders the second switch tube 68*b* conductive to feedback a current $i_b$ through the second intermediate terminal 32*b* and a portion of the current-dividing resistor 26 to the integrator input 22. This feedback current $i_b$ is equal in amplitude and opposite of polarity to that produced by $X_b$ and tends to reduce the resultant integrator input current to zero. In a similar manner, for each of the preselected values $X_a$ to $X_e$, a high voltage switching pulse is produced on the corresponding one of the switching channels 40a to 40e.

The electronic switch 42 in the slave 14 is the same as the switch 20 in the master 12. Each of the current paths 44 from the slave switch 42 corresponds to a different one of the switching channels 40. When the high voltage switching signal appears on one of the switching channels 40, a constant current proportional to the constant voltage $K_2$ is fed through the corresponding one of the slave paths 44. The intermediate terminals 62, 64 on the slave current-dividing resistors 46, 54 divide the constant current from the slave switch 42 in the manner described above. These intermediate terminals 62, 64 are selected to produce voltages $Y_a$ to $Y_e$ at the output terminal that are proportional to the values of the desired function $f$ (X) for the preselected values $X_a$ to $X_e$. The assignment of currents in the slave 14 by the selection of intermediate terminals 62, 64 may be arbitrary, and such assignment is not affected by the values of the variable X. Thus, any desired function of X may be generated in this manner.

The particular connections of the current-dividing resistors 46, 54 and current paths 44 in the slave 14 illustrate schematically the generation of the function Y shown graphically in Figure 3. The slave current paths 44a, 44b, 44d and 44e are connected to the current-dividing resistor 46 of the phase inverter 50. Thus, the voltages Y that are produced at the output 66 of the output amplifier 58 and that correspond to these current paths are negative as shown in Figure 3. The current through the slave current path 44c applied directly to the output amplifier 58, and, therefore, the corresponding output voltage is positive.

If the value of X lies between two preselected values, for example between $X_a$ and $X_b$, the switching signals generated by the master 12 are between the two corresponding switching channels 40a and 40b. The interpolation operation of the feedback loop is shown in Figure 6, wherein the arrows point in the positive direction of change of the quantities shown. If X is intermediate $X_b$ and $X_a$, in some initial time period $t_1$, a high voltage switching signal appears on the first channel 40a of the master 12, so that a current $i_a$ flows from the integrator input 22 to the switch 20. The current $i_a$ is greater in amplitude than the current $i_x$ which is proportional to X. Thus, there is a net decrease of current at the integrator input 22, and the integrator output 36 voltage rises. When the integrator output voltage equals $E_b$, the switching pulse is shifted from switching channel 40a to switching channel 40b. In the next time period $t_2$, a current $i_b$, which is lower in amplitude than $i_x$ is fed to the integrator input 22 from the switch. Thus, there is a net increase in current to the integrator 16 and the integrator output voltage falls. The cycle is complete when the integrator output falls to $E_a$ and the switching pulse is shifted back to channel 40a. The feedback loop tends to reduce to zero the resultant current into the integrator over the cycle period $t_1$ to $t_2$. Thus $$(i_x-i_a)t_1+(i_x-i_b)t_2=0$$

Because the proportionality factor between voltages and currents is the same, the equation may be rewritten $$(X-X_a)t_1+(X-X_b)t_2=0$$

$$X_k=\frac{X_a+X_b}{2}, \text{ and } X_L=\frac{X_a-X_b}{2}$$

Substituting, $$\frac{t_1-t_2}{t_1+t_2}=\frac{X-X_k}{X_L}$$

The average value of the voltage Y at the output terminal over the time period $t_1+t_2$ may be computed as follows:

$$Y=\frac{Y_at_1+Y_bt_2}{t_1+t_2}$$

Let $$Y_k=\frac{Y_a+Y_b}{2}, \text{ and } Y_L=\frac{Y_a-Y_b}{2}$$

Substituting, $$Y=Y_k+Y_L\left(\frac{t_1-t_2}{t_1+t_2}\right)$$

$$Y=Y_k+\frac{Y_L}{X_L}(X-X_k)$$

$$Y=Y_k+\frac{Y_a-Y_b}{X_a-X_b}(X-X_k)$$

The last equation is the equation of the line connecting points $a$ and $b$ on the function shown in Figure 3. Therefore, time-division of the switching pulses on the channels 40a and 40b for values of X between $X_a$ and $X_b$ results in linear interpolation of the function Y between $Y_a$ and $Y_b$. Likewise, there is linear interpolation of the function Y between each pair of adjacent preselected points on the function.

The spacing between preselected values of X which correspond to discrete switching positions may also be made non-linear and arbitrary if desired. This feature makes it possible to choose values of the independent variable X closer together in regions where the slope of the function is changing most rapidly. Thus it is possible to match a function to a prescribed degree of accuracy with the minimum amount of equipment.

The described slave arrangement of a constant-current source in the switch 42 and current-dividing resistors 46, 54 for feeding different currents to the output amplifier is a preferred one. However, it will be readily apparent to one skilled in the art that the different currents may be provided by current paths having different impedances. The impedances may have arbitrarily assigned magnitudes, and appropriate switches may be used for connecting the impedances in circuit between the constant voltage source $K_2$ and the output amplifier. The operation of the system is otherwise to be unchanged.

Referring to Figure 7, there is shown a computing system for generating functions of two variables X and Y. Two master computing devices 12X, 12Y provided, one for each of the variables X and Y. The master computer 12X, and 12Y are the same as the master 12 described above. The number of positions of the X flip-flop 18X and X switch 20X may be different from that of the Y flip-flop 18Y and Y switch 20Y. The X and Y components are shown as having N and M positions, respectively. The X master computer 12X produces time-divided switching signals on the X channels 40X in accordance with the value of X. Similarly, the Y master computer 12Y produces time-divided switching signals on the Y switching channels 40Y in accordance with the value of Y. The switching signals on the X and Y channels 40X and 40Y are independent of each other.

The slave computer 80 has an electronic switch 82 with M$x$N positions, namely, one position for each combination of an X and a Y channel 40X, 40Y. A different current path 84 ($a$, $a$) to 84 ($c$, $c$) each position in the slave electronic switch 82. The slave current paths 84 are referenced by two characters, the first corresponding to the X channels 40X, and the second to the Y channels 40Y. The current paths are connected to different intermediate terminals 86 of two current-dividing resistors 88, 90. The two resistors 88, 90 are respectively connected to the inputs of a phase-inverter 92 and of an output amplifier 94 in the manner described above.

Figure 8:
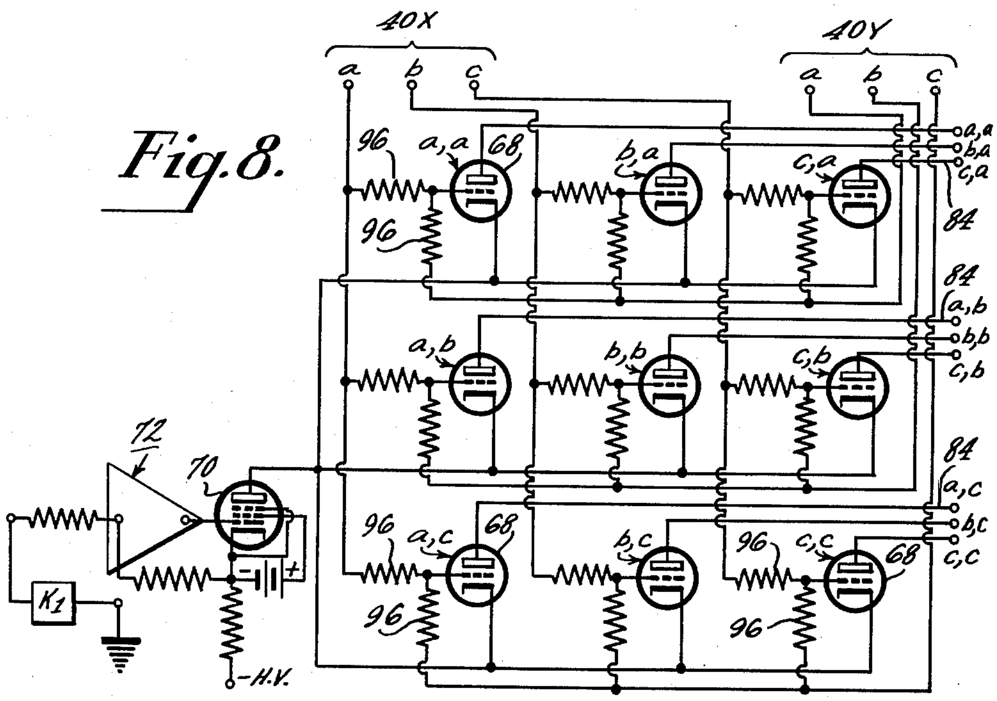
Figure 8 is a schematic circuit diagram of an electronic switch that may be used in the computing device of Figure 7.

An appropriate form of slave electronic switch 82 is shown in Figure 8. M$x$N switch tubes 68 are provided, one for each switch position. The cathodes of the switch tubes 68 are connected together and to the anode of the constant current pentode 70. Each combination of X and Y switching channels 40X, 40Y is connected to the grid of the corresponding switch tube 68 through separate summing resistors 96. Connected to the anode of each one of the switch tubes 68 is a different one of the current paths 84. Switching signals on any combination of X and Y channels 40X, 40Y renders only one of the switching tubes 68 conductive. Thus, if the channels 40X*a* and 40Y*a* in the X and Y masters 12X and 12Y go high only the switching tube 68 (*a, a*) is rendered conductive. Switching tube 68 (*a, b*), for example, receives a high voltage on its grid from channel 40X*a* and a low voltage from channel 40Y*b*. The sum of these two voltages is insufficient to overcome the bias on the cathode of tube 68 (*a, b*) due to conduction in tube 68 (*a, a*). Thus, for each combination of X and Y values, an X channel 40X and a Y channel 40Y receives switching signals, and current flows in the slave current path 84 corresponding to that combination of X and Y channels.

Figures 9, 10:
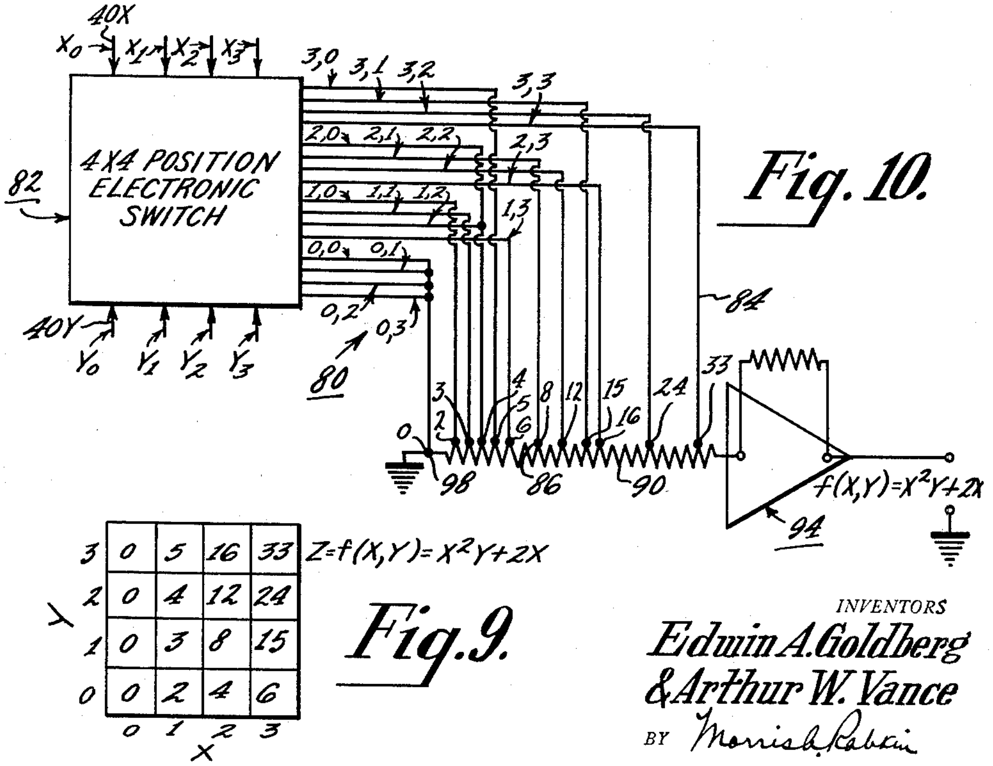
Figure 9 is a table showing values of a function of two variables that may be generated with the computing device of Figure 7; and, Figure 10 is a block diagram of an arrangement of the slave portion of the computing device of Figure 7 for generating the function showing in Figure 9.

The current division provided by the current-dividing resistors 88, 90 in the slave computer 80 may be arbitrarily chosen to generate any arbitrary function of X and Y. The selection of intermediate terminals 86 on the slave current-dividing resistor 90 is illustrated in Figure 10 for the function $Z=X^2Y+2X$. A table of the values of the function Z for a small group of preselected values $X_0$ to $X_3$ and $Y_0$ to $Y_3$ is shown in Figure 9. For $X=0$, the value of the function Z is also zero for all values of Y. Thus, all of the slave current paths 84 corresponding to $X=0$ are connected to the grounded terminal of the slave current-dividing resistor 90. In a similar manner all of the other current paths 84 of the slave 80 are connected to appropriate intermediate terminals 86 on the current-dividing resistor 90 to feed a current to the output amplifier 94 proportional to the function Z for the corresponding combination of X and Y preselected values. The numerals at the intermediate terminals 86 are the corresponding values of the function Z.

The function generator for functions of two variables is also self-interpolating. In general, there is interpolation between the four points surrounding the point at which the value of the function is desired. For example, with respect to the function shown in Figure 9, if X has a value, say 1.5, and Y has a value 0.5, the switching pulses will appear for equal time intervals on channels $X_1$, and $X_2$ and, similarly, for equal time intervals on channels $Y_0$ and $Y_1$. Thus, the current paths (1, 0), (1, 1), (2, 0), and (2, 1) will carry currents for equal time intervals, and there will be linear interpolation among the currents fed to the output amplifier through those four current paths. If the function represents a plane passing through the four points, the exact answer is theoretically provided. If the function has considerable curvature, the preselected points may be taken close together to increase the accuracy of interpolation.

Functions of one or two variables generated by the systems shown in Figures 1 and 7 may be multiplied and divided by other variables. It may be shown by mathematical analysis similar to that in the aforementioned article in the RCA Review by E. A. Goldberg that the output of the function generator of Figure 1 is $$Y=K_2f\left(\frac{X}{K_1}\right)$$

and the output of the generator of Figure 7 is $$Z=K_2f\left(\frac{X}{K_1},\frac{Y}{K_3}\right)$$

If the voltage produced by the voltage source $K_2$ is a variable then the current through the current paths from the slave switch also varies with the variable $K_2$. Thus, the output voltage is the product of the variable $K_2$ and the generated function Y or Z in accordance with the principles of the time-division multipliers cited above. Similarly, K, and $K_3$ may be variable voltage sources. Thus, functions of three and five variables, respectively, may be generated by the function generators of Figures 1 and 7.

It is seen from the above description that a new and improved computer is provided for generating functions of one or more variables. The computing device is extremely accurate and fast in operation. An extreme amount of latitude is permissible in the type of functions that may be generated by this system so that the function generator may be properly termed arbitrary or universal. The equipment involved is practical and of reasonable size. A new and improved current switch is practical and of reasonable size. A new and improved current switch is provided that incorporates an electronic switch and current-dividing resistor. The switch is substantially linear and extremely accurate and which may be used for switching two or more currents of different amplitudes to the input of an amplifier.

What is claimed is:

1. A computing device comprising first means responsive to an input signal for generating first switching signals in accordance with the magnitude of said first input signal; second means responsive to a second input signal for generating second switching signals in accordance with the magnitude of said second input signal; means including switching means for deriving from said first switching signals a first output signal having a magnitude which is a function of the magnitude of the first input signal and for deriving from said second switching signals a second output signal having a magnitude which is a function of the magnitude of said second input signal; an output terminal; and means for alternately applying said first and second output signals to said output terminal on a time division basis to obtain a resultant output signal having a value which is an arbitrary function of said first and second input signals.

2. A computing device comprising first means responsive to a first input signal for generating first switching signals in accordance with the magnitude of said first input signal, second means responsive to a second input signal for generating second switching signals in accordance with the magnitude of said second input signal, means for producing a plurality of additional signals of different magnitudes each corresponding to a different combination of said first and second switching signals, an output terminal, and switching means alternately responsive to each of said combinations of said first and second switching signals for switching to said output terminal the corresponding one of said additional signals alternately on a time division basis.

3. A computing device comprising a plurality of first electrical channels, first means responsive to a first input signal for generating switching signals and for selectively applying said switching signals to said first channels in accordance with the magnitude of said first input signal, a plurality of second electrical channels, second means responsive to a second input signal for generating switching signals and for selectively applying said switching signals to said second channels in accordance with the magnitude of a second input signal, an output terminal, and means for feeding to said output terminal signals varying as a function of said first and second input signals, said feeding means including a plurality of electrical paths arranged to carry different magnitude signals, each of said paths corresponding to a different combination of said first and second channels, and switching means alternately responsive to switching signals simultaneously occurring on each of said combinations of first and second channels for coupling said output terminal on a time division basis in circuit with the ones of said paths corresponding to the combination of selected first and second channels.

4. A computing device comprising a plurality of first electrical channels, first means responsive to a first input signal for generating switching signals and for selectively applying said switching signals to said first channels in accordance with the magnitude of said first input signal, a plurality of second electrical channels, second means responsive to a second input signal for generating switching signals and for selectively applying said switching signals to said second channels in accordance with the magnitude of said second input signal, a signal source, an output terminal, a plurality of third electrical channels each corresponding to a different combination of said first and second channels, and switching means responsive to switching signals simultaneously occurring on each of said combinations of first and second channels for alternately coupling said signal source to said output terminal through the ones of said third channels corresponding to the combinations of selected first and second channels on a time division basis.

5. A computing device comprising a plurality of first electrical channels, first means responsive to a first input signal for applying switching signals to one of said first channels selected in accordance with the magnitude of said first input signal, a plurality of second electrical channels, second means responsive to a second input signal for applying switching signals to one of said second channels selected in accordance with the magnitude of said second input signal, a signal source, a plurality of third electrical channels each corresponding to a different combination of said first and second channels, and switching means responsive to switching signals simultaneously occurring on a selected combination of first and second channels for alternately coupling said signal source to the two of said electrical channels corresponding to said selected combinations of first and second channels on a time division basis.

6. A computing device comprising a plurality of first electrical channels, first means responsive to a first input voltage for selectively applying a switching signal to one of said first channels in accordance with the amplitude of said first input voltage, a plurality of second electrical channels, second means responsive to a second input voltage for selectively applying a switching signal to one of said second channels in accordance with the amplitude of said second input voltage, a voltage source, an output terminal, means providing a plurality of electrical paths each corresponding to a different combination of said first and second channels and having a different conductance value, and switching means responsive to switching signals simultaneously occurring on selected combinations of first and second channels for alternately coupling said voltage source to said output terminal on a time division basis through the ones of said electrical paths corresponding to said selected combinations of first and second channels.

7. A computing device as recited in claim 6 wherein said first and second means for applying switching signals respectively include first and second feedback circuits, each of said feedback circuits comprising integrating amplifier means, means for applying a current to the input of said integrating means in accordance with an input voltage, means providing a plurality of electrical paths for applying different magnitude currents to said integrating means input, each of said electrical paths in each of said first and second feedback circuits corresponding to a different one of the associated first and second electrical channels, means for generating switching signals and for applying said switching signals to a selected one of said associated channels in accordance with the voltage amplitude at the output of said integrating means, and switching means responsive to said switching signals for coupling in circuit with said integrating means input the one of said electrical paths corresponding to the selected one of said associated channels.

8. A computing device comprising at least three first electrical channels, means responsive to an input signal for generating switching signals and for selectively applying said switching signals to one of said first channels selected in accordance with an associated magnitude of said input signal, said switching signal means being operable for applying said switching signals alternately to two of said first channels on a time-division basis in accordance with magnitudes of said input signal between the associated magnitudes, a signal source, at least three additional electrical channels each corresponding to a different one of said first channels, and switching means responsive to said switching signals applied to a selected one of said first channels for coupling said signal source to said additional channels on a time division basis as a function of said selected channels.

9. A computing device comprising at least three electrical channels, means responsive to an input signal for generating switching signals and for selectively applying said switching signals to one of said channels in accordance with as associated magnitude of said input signal, said switching signal means being operable for applying said switching signals alternately to two of said first channels on a time-division basis in accordance with magnitudes of said input signal between the associated magnitudes, an output terminal, and means for feeding to said output terminal signals varying as a function of said input signal, said feeding means including at least three electrical paths for carrying signals of different magnitudes, each of said paths corresponding to a different one of said channels, and switching means responsive to switching signals on selected ones of said channels for coupling in circuit with said output terminal said paths on a time division basis as a function of said selected channels.

10. A computing device comprising at least three electrical channels, means responsive to an input voltage for selectively applying a switching signal to one of said channels selected in accordance with an associated amplitude of said input voltage, said switching signal applying means being operable for applying said switching signals alternately to two of said channels on a time-division basis in accordance with amplitudes of said input voltage between the associated amplitudes, a voltage source, output means, and means for feeding to said output means currents varying as a function of said input voltage, said feeding means including means providing at least three electrical paths for carrying different magnitude currents, each of said paths corresponding to a different one of said channels, and switching means responsive to switching signals in a selected one of said channels for coupling said voltage source to said output terminal on a like time division basis through the ones of said paths on a time division basis as a function of said selected channels.

11. A computing device for generating switching signals on a time-division basis in accordance with a variable having at least three predetermined values, said computing device comprising an integrator, means for applying a current proportional to said variable to the input of said integrator, a voltage amplitude responsive circuit having at least three stable operating conditions and at least three output channels each corresponding to a different one of said operating conditions and to a different one of said predetermined variable values, said circuit assuming different operating conditions in accordance with the voltage output of said integrator and applying a switching signal on the one of said output channels corresponding to the assumed operating condition, at least three channels for carrying different magnitude currents, each of said current carrying channels corresponding to a different one of said switching signal channels, and switching means responsive to said switching signals on each of said channels for coupling the corresponding one of said current carrying channels in circuit with said integrator input, whereby a switching signal is applied to the corresponding channel when said variable assumes one of said predetermined values, and switching signals are applied alternately on a time-division basis to the two corresponding channels when said variable assumes a value between two of said predetermined values to provide a substantially linear interpolation of said variable between said predetermined values.

12. A computing device for generating a function of a variable represented by a variable signal, said device comprising at least three first electrical channels each associated with a different magnitude of said variable signal, means responsive to said variable signal for generating switching signals and for applying said switching signals to the associated one of said first channels for any one of said different magnitudes of said variable signal and alternately to the associated two of said first channels for a signal magnitude between two of said different magnitudes, output means, at least three second electrical channels each associated with a different one of said first channels, and switching means responsive to said switching signals applied to said first channels for completing a circuit with said output means and said second channels, whereby different magnitude signals on a time division basis are applied to said output means as a function of said variable signal.

13. In combination, an integrating amplifier; means supplying a signal having an amplitude X to the amplifier, where X lies between two discrete values $X_1$ and $X_2$; a feedback circuit including switch means for supplying a second input signal to said amplifier which varies with time between two discrete amplitudes $-X_1$ and $-X_2$ and which has an average value $-X$; a second integrating amplifier; and means responsive to said switch means and including said second amplifier for producing an output signal which varies with time between a value $Y_1$ which is an arbitrary function of $X_1$ and a value $Y_2$ which is the same arbitrary function of $X_2$ and which has an average value Y which is a linear interpolation between $Y_1$ and $Y_2$.

References Cited in the file of this patent

UNITED STATES PATENTS

| | | |
|---|---|---|
| 2,551,740 | Hills | May 8, 1951 |
| 2,797,865 | Beattie et al. | July 2, 1957 |

OTHER REFERENCES

Goldberg: "Step Multiplier in Guided Missile Computer," Electronics, August 1951, vol. 24, No. 8, pp. 120–124.

A Palimpsest on the Electronic Analog Art, printed by Geo. A. Philbrick Researcher, Inc., 230 Congress Street, Boston, Mass., pages 266–270, "Continuous Electronic Representation of Non-linear Functions of *n* Variables," November 1, 1951.